United States Patent [19]

Schroeder et al.

[11] Patent Number: 4,881,221
[45] Date of Patent: Nov. 14, 1989

[54] METHOD AND APPARATUS FOR DISABLING AN ECHO CANCELLER ON A DIGITAL TELECOMMUNICATIONS NETWORK

[75] Inventors: George L. Schroeder, Sherwood; Francis O. Couch, Portland; Chamna Saenguraiporn, Aloha, all of Oreg.

[73] Assignee: Kentrox Industries, Inc., Portland, Oreg.

[21] Appl. No.: 210,728

[22] Filed: Jun. 23, 1988

[51] Int. Cl.$^4$ .............................................. H04B 3/20
[52] U.S. Cl. ................................. 370/32.1; 370/110.2; 379/408; 371/47.1
[58] Field of Search ...................... 340/825.58; 375/40, 375/106, 108; 370/110.2, 100, 110.1, 32.1, 32; 371/47, 69; 379/408, 97, 93, 102, 103, 104, 105, 410, 411

[56] References Cited

U.S. PATENT DOCUMENTS

| | | | |
|---|---|---|---|
| 3,160,813 | 12/1964 | Biggi et al. | 325/58 |
| 3,582,789 | 6/1971 | Mick | 325/321 |
| 3,783,194 | 1/1974 | Vilips et al. | 379/407 |
| 3,842,399 | 10/1974 | Kneuer et al. | 340/146.1 BA |
| 3,979,559 | 9/1976 | Roedel et al. | 379/407 X |
| 3,985,965 | 10/1976 | Field et al. | |
| 4,009,336 | 2/1977 | Saliga | |
| 4,076,964 | 2/1978 | Henrion et al. | |
| 4,110,562 | 8/1978 | Moed | |
| 4,126,764 | 11/1978 | Downey et al. | |
| 4,156,111 | 5/1979 | Downey et al. | |
| 4,158,107 | 6/1979 | Nicholas | |
| 4,171,466 | 10/1979 | Carbrey | |
| 4,194,092 | 3/1980 | Luder | |
| 4,205,203 | 5/1980 | Mehta et al. | 370/110 |
| 4,227,248 | 10/1980 | Munter | 370/110 |
| 4,288,664 | 9/1981 | Araseki | |
| 4,316,284 | 2/1982 | Howson | 370/105 |
| 4,347,620 | 8/1982 | Black et al. | 375/112 |
| 4,377,863 | 3/1983 | Legory et al. | 371/42 |
| 4,390,983 | 6/1983 | Duplessis et al. | 370/77 |
| 4,399,535 | 8/1983 | Southard | 370/110.2 |
| 4,411,007 | 10/1983 | Rodman et al. | 375/107 |
| 4,498,171 | 2/1985 | Munter et al. | 370/110.2 |
| 4,541,088 | 9/1985 | Sarson | 370/110.2 |
| 4,570,260 | 2/1986 | Basehore | 370/110.2 |
| 4,571,723 | 2/1986 | Lusignan et al. | 370/110.2 |
| 4,658,420 | 4/1987 | Fukushi et al. | 379/407 |
| 4,674,088 | 6/1987 | Grover | 370/100 |
| 4,740,962 | 4/1988 | Kish, III | |

Primary Examiner—Jin F. Ng
Assistant Examiner—Randall Vaas
Attorney, Agent, or Firm—Klarquist, Sparkman, Campbell, Leigh & Whinston

[57] ABSTRACT

A method and apparatus for disabling an echo canceller in a framed digital network from a remote terminal that is copuled to the network through an unframed data link. Control is effected by sending N different bit sequences from the remote terminal, where N is the number of different framing alignments that may be imposed on the unframed data by the network. The different sequences are chosen so that one will be framed by the network as the requisite control tone regardless of which framing alignment is actually imposed.

11 Claims, 4 Drawing Sheets

ROM

| | | | |
|---|---|---|---|
| PATTERN #1 | BYTE 1 | X 1 0 0 0 0 0 | (0000) |
| | BYTE 2 | 1 1 1 1 1 0 0 | (0001) |
| | BYTE 3 | 1 1 0 1 0 0 1 | (0002) |
| | BYTE 4 | 0 1 0 0 1 0 1 | (0003) |
| | BYTE 5 | 0 0 1 0 0 1 1 | (0004) |
| | BYTE 6 | 0 1 1 0 1 0 0 | (0005) |
| | ⋮ | | |
| | BYTE 79 | 0 0 1 0 1 0 0 | (004E) |
| | BYTE 80 | 1 0 0 0 0 1 0 | (004F) |
| PATTERN #2 | BYTE 1 | 0 1 0 0 0 0 0 | (0050) |
| | BYTE 2 | 0 1 1 1 1 1 0 | (0051) |
| | BYTE 3 | 0 1 1 0 1 0 0 | (0052) |
| | BYTE 4 | 1 0 1 0 0 1 0 | (0053) |
| | BYTE 5 | 1 0 0 1 0 0 1 | (0054) |
| | ⋮ | | |
| PATTERN #7 | BYTE 1 | 0 0 0 0 1 0 1 | (01E0) |
| | BYTE 2 | 0 0 0 0 0 0 1 | (01E1) |
| | BYTE 3 | 1 1 1 1 0 0 1 | (01E2) |
| | ⋮ | | |
| | BYTE 79 | 0 1 0 1 0 0 0 | (022E) |
| | BYTE 80 | 0 1 0 1 0 0 1 | (022F) |

FIG. 1

ROM

| | | | | | | | | | | |
|---|---|---|---|---|---|---|---|---|---|---|
| PATTERN #1 | BYTE 1 | X | 1 | 0 | 0 | 0 | 0 | 0 | 0 | (0000) |
| | BYTE 2 | 1 | 1 | 1 | 1 | 1 | 0 | 0 | | (0001) |
| | BYTE 3 | 1 | 1 | 0 | 1 | 0 | 0 | 1 | | (0002) |
| | BYTE 4 | 0 | 1 | 0 | 0 | 1 | 0 | 1 | | (0003) |
| | BYTE 5 | 0 | 0 | 1 | 0 | 0 | 1 | 1 | | (0004) |
| | BYTE 6 | 0 | 1 | 1 | 0 | 1 | 0 | 0 | | (0005) |
| | ⋮ | | | | | | | | | |
| | BYTE 79 | 0 | 0 | 1 | 0 | 1 | 0 | 0 | | (004E) |
| | BYTE 80 | 1 | 0 | 0 | 0 | 0 | 1 | 0 | | (004F) |
| PATTERN #2 | BYTE 1 | 0 | 1 | 0 | 0 | 0 | 0 | 0 | | (0050) |
| | BYTE 2 | 0 | 1 | 1 | 1 | 1 | 1 | 0 | | (0051) |
| | BYTE 3 | 0 | 1 | 1 | 0 | 1 | 0 | 0 | | (0052) |
| | BYTE 4 | 1 | 0 | 1 | 0 | 0 | 1 | 0 | | (0053) |
| | BYTE 5 | 1 | 0 | 0 | 1 | 0 | 0 | 1 | | (0054) |
| | ⋮ | | | | | | | | | |
| PATTERN #7 | BYTE 1 | 0 | 0 | 0 | 0 | 1 | 0 | 1 | | (01E0) |
| | BYTE 2 | 0 | 0 | 0 | 0 | 0 | 0 | 1 | | (01E1) |
| | BYTE 3 | 1 | 1 | 1 | 1 | 0 | 0 | 1 | | (01E2) |
| | ⋮ | | | | | | | | | |
| | BYTE 79 | 0 | 1 | 0 | 1 | 0 | 0 | 0 | | (022E) |
| | BYTE 80 | 0 | 1 | 0 | 1 | 0 | 0 | 1 | | (022F) |

METHOD AND APPARATUS FOR DISABLING AN ECHO CANCELLER ON A DIGITAL TELECOMMUNICATIONS NETWORK

The invention described herein was made in the performance of work under NASA contract number NAS8-39000 and is subject to the provisions of Section 305 of the National Aeronautics and Space Act of 1958 (42 U.S.C. 2457).

FIELD OF THE INVENTION

The present invention relates to digital communications, and more particularly to the transmission of byte-organized data to a receiving station that may employ byte boundaries different than the transmitting station.

BACKGROUND AND SUMMARY OF THE INVENTION

For expository convenience, the present invention is illustrated with reference to the transmission of a disabling tone to an echo canceller apparatus on a digital communication circuit. However, the invention is not so limited and is useful in numerous other applications.

Echo cancellers are commonly used on long distance communication circuits to suppress echoes that may be caused by various delays and impedance mismatches along the path. Echo cancellers add greatly to the intelligibility of voice transmissions.

In certain circumstances, echo cancellers are undesirable. Such is the case, for example, when transmitting digital data. Accordingly, echo canceller apparatuses often include provisions whereby they can be disabled upon receipt of a predetermined command signal. In most systems, this command signal takes the form of a 2100 hertz tone.

An illustrative application of the use of this command signal is found in 300 baud computer modems. 300 baud modems generally encode the data being transmitted in frequency shift keying format. A space (logic 0) is transmitted as a 2000 hertz tone and a mark (logic 1) is transmitted as a 2200 hertz tone. A transmission of data at 300 baud using these tones includes a 2100 hertz component that is sufficient to disable any echo cancellers along the circuit. Thus, 300 baud modems act automatically to disable any echo cancellers that may interfere with their accurate transmission of data.

In other data transmission applications, a 2100 hertz tone can be transmitted continuously with other data tones. In still other applications, a 2100 hertz tone can be transmitted for a few hundred milliseconds when the data link is first established and discontinued thereafter. Both techniques have been used to disable echo cancellers on digital circuits.

Most of the prior art systems employing the disabling feature of echo cancellers are analog communications circuits in which data is encoded as a series of audio tones. A more difficult situation arises on true digital lines in which "1"s and "0"s are transmitted directly, without being first encoded into tone form. Exemplary of such systems is the Accunet ® 56 kbit/sec. service offered by AT&T. In this system, the only means of transmitting the 2100 hertz tone to the echo canceller is in digital form. That is, the analog 2100 hertz tone must be digitized and the digitized samples then transmitted serially along the circuit. In an exemplary system, the samples are in the form of 7-bit bytes.

The problem encountered in disabling echo cancellers on purely digital circuits is that it requires knowledge of the byte boundaries used by the digital network to which the echo canceller is coupled. This information is generally not available to end users of the system. End users simply apply serial data to the circuit without regard to the framing information that is later added to the data by the network. (In networks such as the Accunet ® 56, serial data is sent without any framing information from the user to the switching office. A digital switch at the switching office then frames this serial data stream into bytes for further transmission by adding an eighth signalling bit after every seven bits received from the user. Th data then maintains this byte-organization until it is relayed finally to the receiving station, at which time the framing information is stripped off and an undelimited string of serial data is provided.)

The echo cancellers of concern are in the byte-framed portion of the digital network and thus require that the digitized 2100 hertz tone have the proper byte boundaries. Since the originating station operates without reference to the framing boundaries employed by the network, the originating station has heretofore been unable to disable the network echo cancellers.

To disable the echo cancellers on digital networks, it has previously been necessary to call a network operator and ask the operator to disable the echo cancellers. The operator is able to perform this operation because the telecommunications carrier can introduce the digitized 2100 hertz disabling signal into the network after it has been framed into known eight bit bytes.

This technique of calling the operator whenever disabling of the echo cancellers is desired is unsatisfactory. The only alternative has been to lease dedicated lines that do not include echo cancellers. This option, of course, is expensive.

Accordingly, there remains a need for a technique to permit byte-organized data to be sent to a byte-synchronous receiving system from an originating station that has no information about the framing boundaries employed by the receiving system.

Consequently, it is an object of the present invention to permit the successful transmission of byte-organized data from an originating station to a receiving station without regard to the byte boundaries employed by said stations.

It is a more particular object of the present invention to permit the disabling of echo cancellers on digital networks by transmission of control signals from originating stations that have no information about the framing boundaries employed by the echo canceller.

According to one embodiment of the present invention, an apparatus associated with the originating station on a digital data network transmits a burst of digitally encoded 2100 hertz tone to the network for a brief period, such as 500 milliseconds. The data comprising the burst is then bit-shifted one bit relative to the prior transmission and is retransmitted. This process is repeated until bursts of the 2100 hertz data have been transmitted with each possible alignment of the byte boundary (i.e. until bursts of the data have been transmitted N times where N is the number of data bits in a byte.) The byte boundaries employed by one of these bursts will coincide with the byte boundary employed by the digital network of which the echo cancellers of concern are a part. Thus, one burst will be successful in disabling the echo cancellers without intervention of an operator and without resort to use of dedicated lines.

The foregoing and additional objects, features and advantages of the present invention will be more readily apparent from the detailed description, which proceeds with reference to the accompanying drawings.

BRIEF DESCRIPTION OF THE DRAWINGS

FIG. 1. is a map showing the organization of seven 80 byte patterns of digitized 2100 hertz information stored in a ROM according to one embodiment of the present invention.

DETAILED DESCRIPTION OF THE PREFERRED EMBODIMENT

As noted above, the illustrated embodiment of the present invention relies on the transmission of several different 2100 hertz data bursts. Each burst is a bit-shifted version of the others. The burst is transmitted with all possible bit shifts, so one is certain to be framed by the carrier's digital switching circuitry into frames that will appear to the echo cancellers as bytes of 2100 hertz tone data. When the echo cancellers receive the properly-framed data burst, the echo cancelling feature is disabled.

Figure 5:
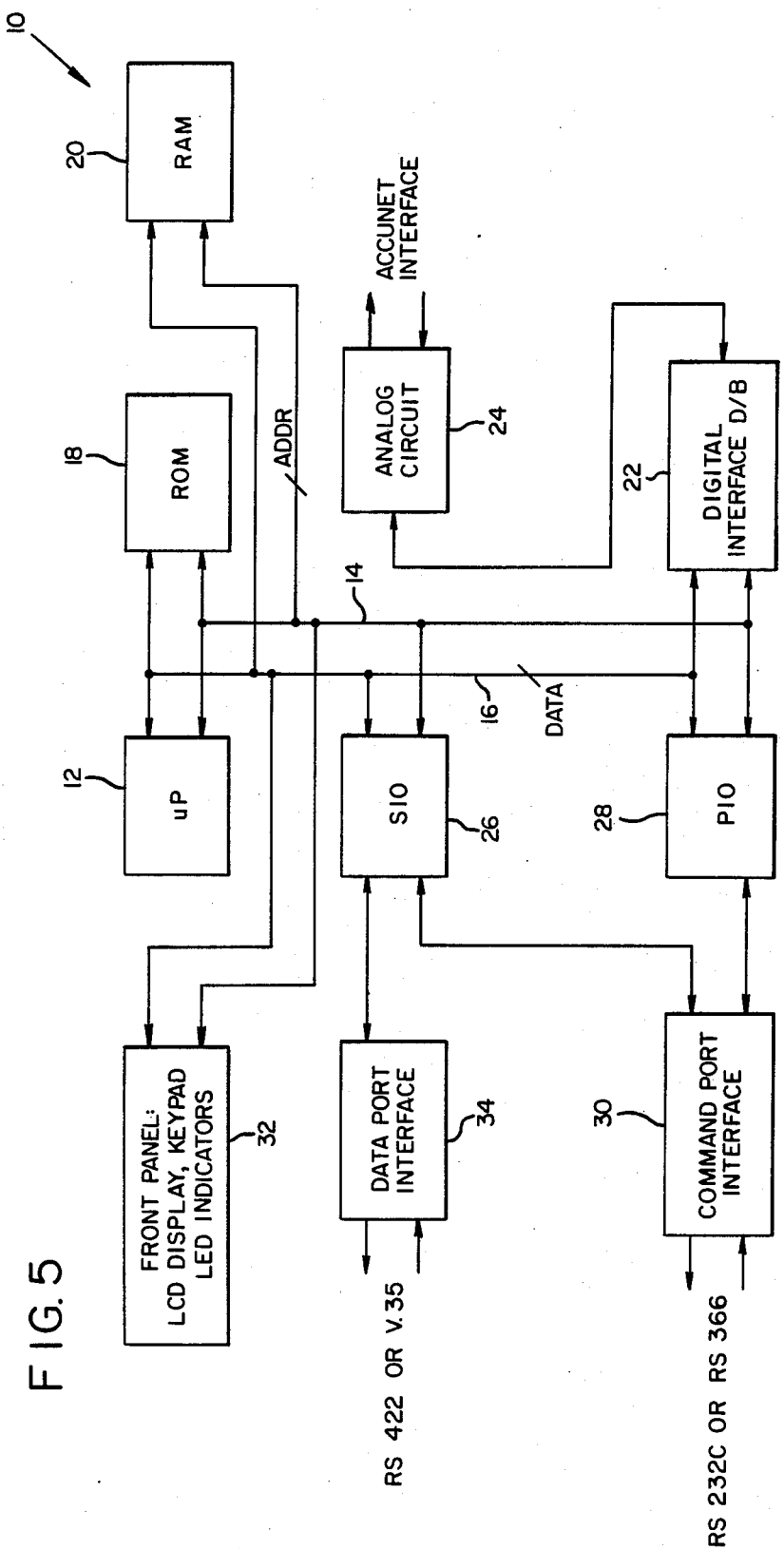
FIG. 5 is a block diagram showing the interconnection of hardware elements employed in the present invention.

In the illustrated embodiment, the 2100 hertz data which comprises these bursts is stored in a ROM memory 18 (FIG. 5). This data takes the form of 80 digitized samples of a 2100 hertz waveform, each sample of which is stored as a 7-bit byte. Seven different versions, or patterns of this digitized information are stored in the ROM memory. Referring to FIG. 1, the first memory location (0000 hex) contains the first byte of the first pattern. Byte two is stored at location 0001, byte three at location 0002, etc. (The ROM employed is organized with eight bit bytes, so the least significant bit of each byte is masked and is ignored in the present embodiment). Each 80 byte pattern corresponds to 100 cycles of the 2100 hertz tone.

The second pattern is stored in ROM beginning immediately following the eightieth byte of the first pattern. This second pattern is identical to the first pattern except it has been shifted right one bit, as illustrated in FIG. 1. Each succeeding pattern is similarly a bit-shifted version of the preceding pattern.

In operation, the 80 bytes of the first pattern are transmitted sequentially. At a 56 kilobit per second transmission rate, a single pass through the pattern takes ten milliseconds. Most echo cancellers require a tone burst of at least 350 milliseconds to guarantee activation. Consequently, at least 35 repetitions of a pattern are required to provide a 350 millisecond tone duration. To provide an error margin, the preferred embodiment cycles through the pattern 50 times, thus producing 500 milliseconds worth of digitally encoded 2100 hertz data.

After this first 500 millisecond transmission (which consists of fifty repetitive passes through the 80 bytes comprising the first pattern), the second pattern is transmitted similarly. At the conclusion of 50 cycles through the second pattern, the third, fourth, fifth, sixth and seventh patterns are transmitted. The entire echo canceler disabling routine thus takes 500 milliseconds per pattern times seven patterns, or 3.5 seconds.

Most of the circuitry needed to implement this technique is already incorporated in terminal interface equipment conventionally used with digital networks. Foremost among this circuitry is a microprocessor, which already finds application in existing terminal interface equipment to control operation of the terminal. Such a microprocessor can be programmed in accordance with the flow charts of FIGS. 2-4 to perform the sequence of echo canceller disabling steps employed by the present invention.

Figure 2:
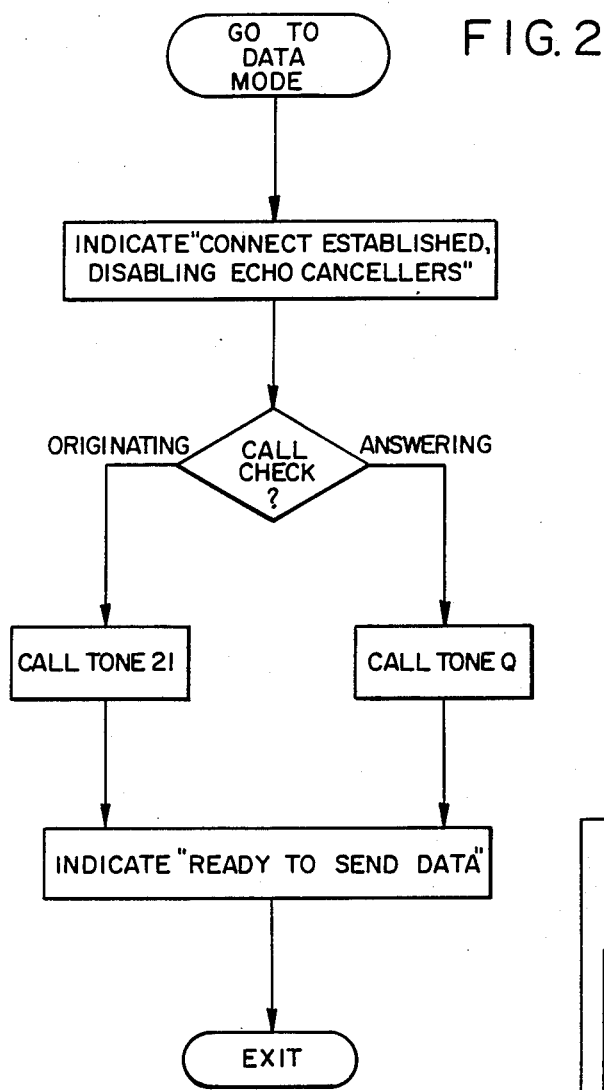
FIG. 2 is a flow chart indicating the steps performed by the terminal interface equipment during the initiation of a data link according to one embodiment of the present invention.
Figure 3:
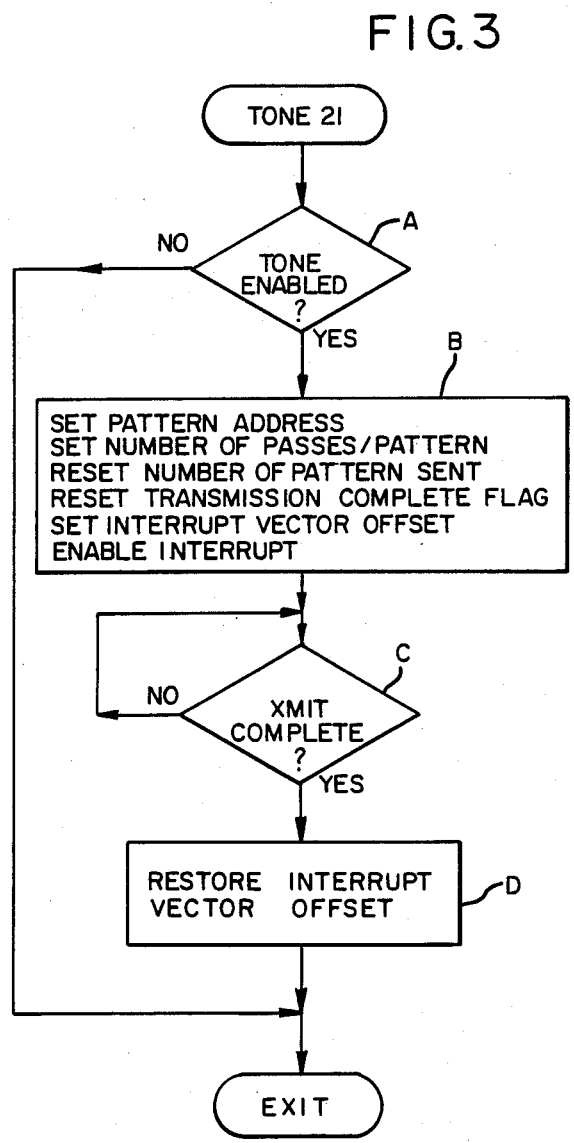
FIG. 3 is a flow chart of the TONE21 routine called by the program of FIG. 2.
Figure 4:
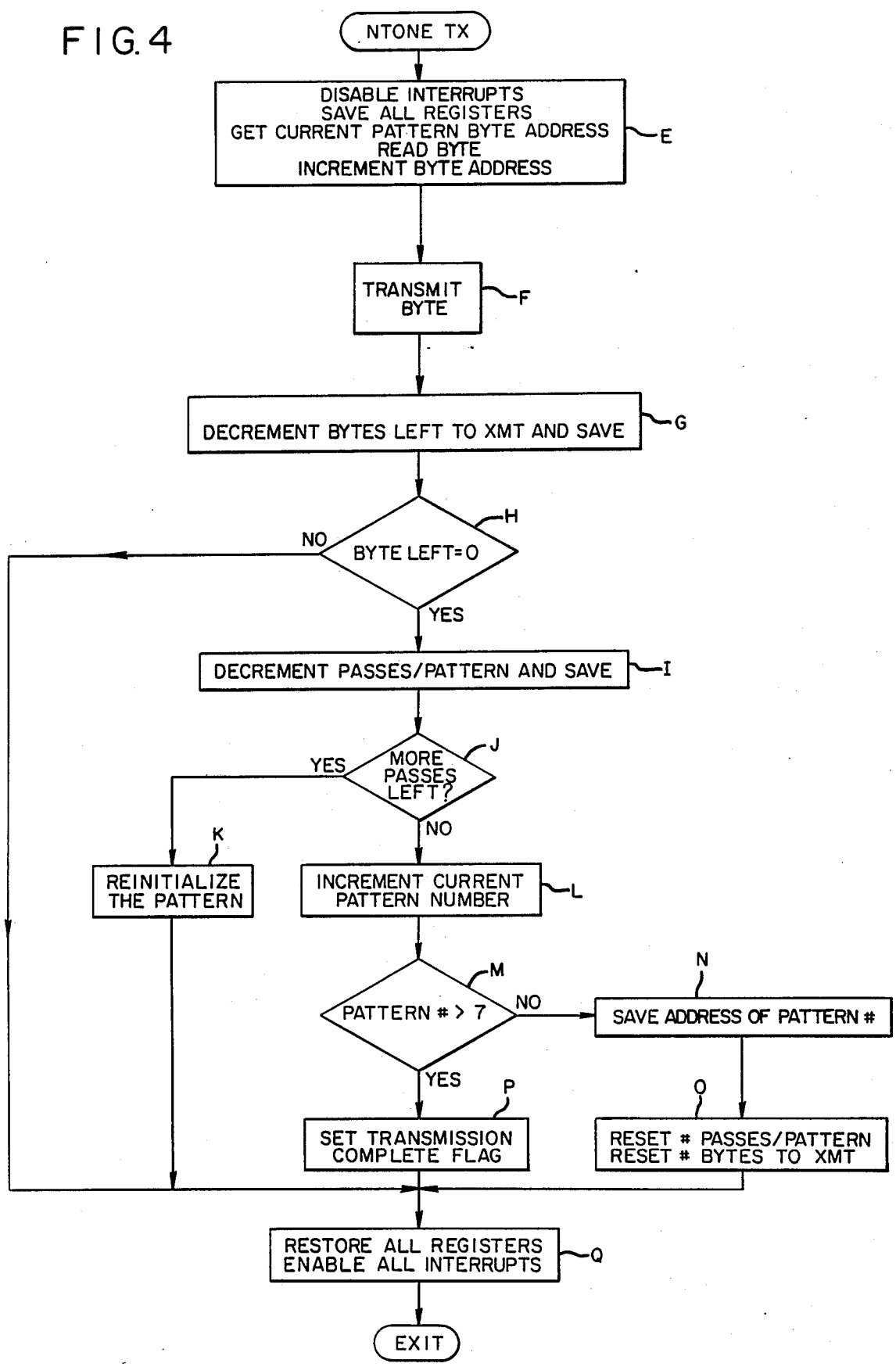
FIG. 4 is a flow chart of an interrupt routine that is executed during the TONE21 routine of FIG. 3.

The routines illustrated by the flow charts of FIGS. 2-4 use a number of counters, flags and address pointers during the course of their operation. These variables are described below:

ADDRESS TO TRANSMIT—contains an address pointer to the next byte that the system is to transmit.

BYTES LEFT TO TRANSMIT—a counter indicating the number of bytes in the 80 byte pattern that remain to be transmitted in the current pass through the pattern.

PASSES PER PATTERN—contains the number of passes the process is to make through each pattern. This variable is set to 50 in the illustrated embodiment.

PATTERN ADDRESS—contains the address of the first byte of the current pattern. This address is a base from which counters can increment and the stopping point can be determined.

PATTERNS SENT—a counter indicating the number of patterns that have been sent to completion (i.e. the number of patterns that have been sent fifty times).

TRANSMISSION COMPLETE FLAG—a flag that is set to "1" when all seven patterns have been sent to completion.

Referring now to FIG. 2, in typical AT&T Accunet operation, an originating station dials a receiving station through a digital switch. The switch transmits data to the receiving terminal interface equipment, putting it into "data mode". (A corresponding signal is sent from the switch to the originating terminal interface equipment when the receiving terminal answers).

Upon receipt of the "data mode" signal, the terminal indicates to the user that a data connection has been established and that the echo cancellers are being disabled. The terminal interface equipment then determines whether the call is originating or being answered by the equipment. If originating, a routine named TONE21 is called. If answering, a routine named TONEQ is called. The process executed by these routines is identical and follows the flow chart of FIG. 3. For convenience of illustration, the flow chart of FIG. 3 is labelled TONE21, it being understood that the same steps are followed in the TONEQ routine with different (null) data.

Referring now to FIG. 3, the routine TONE 21 first determines at block A whether the system has been configured to send an echo cancelling 2100 hertz tone. (A tone may not be desired if, for example, the circuit is known to not include echo cancellers. By avoiding the tone transmission in such instances, the connect time can be decreased by approximately 3.5 seconds.) Assuming, as is usually the case, that the tone transmission is desired, the process proceeds into block B.

In block B, the process first loads the beginning address of the tone patterns into the memory location PATTERN ADDRESS. For purposes of illustration, this address is 0000 hex. (In actual practice, the ROM generally includes other coding so the tone patterns are offset from this address.)

The process next loads PASSES PER PATTERN with 50. (As noted, a single pass through the 80 byte pattern takes ten milliseconds. To transmit each bit-shifted tone for 500 milliseconds, fifty passes must be made through each pattern.) The PATTERNS SENT counter and the TRANSMISSION COMPLETE FLAG are reset from any previous use. An interrupt vector offset is then set and the interrupt enabled. (The interrupt vector offset indicates to the interrupt service routine the address to which it should go when calling the interrupt routine. The offset directs the interrupt service routine to the address of an interrupt routine named NTONE TX, discussed below.) After enabling interrupts, the process drops into a repetitive looping through block C, which checks whether the TRANSMISSION COMPLETE FLAG has been set to "1".

The looping through block C is suspended whenever a system interrupt occurs. In the preferred embodiment, an interrupt occurs every 17.85 microseconds. When this occurs, the microprocessor passes once through the interrupt routine NTONE TX shown in FIG. 4. NTONE TX sends out one byte of data. (The bulk of the complexity of NTONE TX in the figure is due to preparing the various memory locations for the next interrupt.)

Referring now to FIG. 4, interrupt routine NTONE TX first disables any further interrupts (many microprocessors automatically disable further interrupts by hardware when an interrupt occurs) and then saves all of the microprocessor's registers, as shown in block E. The routine then loads ADDRESS TO TRANSMIT and reads the byte stored at that location. ADDRESS TO TRANSMIT is then incremented.

In block F, the apparatus transmits the current data byte in the 2100 hertz pattern. In block G the counter BYTES LEFT TO TRANSMIT is decremented. The process then drops into block H to determine whether the counter BYTES LEFT TO TRANSMIT equals 0. If it does not, the process skips several steps and exits from the routine through block Q, which restores all of the registers and reenables the interrupts. The process then returns to the TONE21 routine shown in FIG. 3.

The TONE21 routine resumes its checking to determine whether the TRANSMISSION COMPLETE FLAG has been set by the interrupt routine. It continues this checking until the next system interrupt occurs.

At the next system interrupt, the NTONE TX routine of FIG. 4 is again called. This routine transmits the next byte in the first pattern and again decrements BYTES LEFT TO TRANSMIT as above. Provided there are still bytes left in the pattern that have not been transmitted, the interrupt routine terminates as described above, simply restoring the registers and reenabling the interrupts.

On the eightieth interrupt call, the byte transmitted will be the last byte in the first pattern. The decrementing of BYTES LEFT TO TRANSMIT will indicate that no bytes remain. The interrupt routine will then continue for the first time into block I, where it decrements the counter PASSES PER PATTERN from its initial value of 50 to 49. The process then checks, at box J, whether any more passes through the pattern are still required. In this instance, there are still 49 passes left to send. Consequently, the pattern is reinitialized, as indicated in block K. This consists of loading the memory location ADDRESS TO TRANSMIT from the memory location PATTERN ADDRESS (in this case 0000 hex). The interrupt routine is then left by restoring the registers and reenabling the interrupts.

At the next system interrupt, the process begins again by transmitting the first byte in the first pattern. The above-described process repeats until all 80 bytes have been transmitted a second time.

When the last byte of the first pattern has again been sent, the memory location PASSES PER PATTERN is again decremented, completing the second pass through the first pattern. The third pass is then begun.

On the fiftieth pass through the first 80 byte pattern, after the last byte has been transmitted, the routine decrements PASSES PER PATTERN and determines at block J that there are no passes left. At this point, the first pattern has been repeated fifty times, thus transmitting a total of 500 seconds of digitized 2100 hertz tone to the network. The routine then increments the PATTERNS SENT counter from 0 to 1, as indicated in block L. It then checks, in block M, whether the counter PATTERNS SENT is greater than seven. Since it is not, the pointer ADDRESS TO TRANSMIT (which now points to the first byte in the second pattern) is stored in PATTERN ADDRESS (as shown in block N), reinitializing this latter memory for use with the second pattern. The memory location PASSES PER PATTERN is reloaded in block O with the value 50 and the memory location BYTES LEFT TO TRANSMIT is reloaded with 80. The interrupt routine then terminates through block Q and the process loops idly through black C of FIG. 3 until the next system interrupt occurs.

The above-described process repeats to send the 80 bytes comprising the second pattern 50 times. The PATTERN SENT memory location is then incremented and patterns 3, 4, 5, 6 and 7 are then sent.

After the eightieth byte of the seventh pattern is transmitted for the fiftieth time, the interrupt routine proceeds all the way through to block P, where it stores a "1" in the TRANSMISSION COMPLETE FLAG memory location. The NTONE TX routine is then exited for the last time.

The TONE21 routine, which has been checking the TRANSMISSION COMPLETE FLAG as a background process between interrupts, now notices that the TRANSMISSION COMPLETE FLAG has been set. Consequently, it restores the interrupt vector offset in block D and exits. This exit sends the process back to the last block in the program of FIG. 2, in which the hardware indicates to the user (via a "CONNECT" message and LEDs on the interface panel) that the echo cancellers have been disabled and that the system is ready to send data.

Routine TONEQ mentioned above is identical to routine TONE21 except that the data transmitted is all "1"s. The TONEQ routine is used when the terminal interface equipment is receiving, rather than originating a call. It delays initiation of the normal data phase of operation for a period, 3.5 seconds, sufficient for the terminal interface equipment at the originating station to send the tone to disable the echo cancellers.

FIG. 5 shows a schematic block diagram of a representative terminal interface unit 10 that can employ the principles of the present invention. The microprocessor 12 is a Z80 and is connected to an 16-bit address bus 14 and an 8-bit data bus 16. ROM 18 contains the pattern information and firmware programming, such as the TONEQ and TONE21 routines. RAM 20 serves as a scratch pad for saving address and counter values.

A digital interface 22 serves as an interface between the Z80 microprocessor 12 and analog circuitry 24. The analog circuitry 24 translates the digital information from the digital interface 22 into Accunet format.

The terminal interface equipment 10 further includes serial and parallel I/O ports 26, 28. A command port interface 30 couples to RS232C or RS366 data lines and indicates to the user various parameters of system operation. It is, in many respects, redundant of the front panel display 32 that is conventional with such units. A data port interface 34 interfaces with the source of digital data, typically a computer. The front panel LCD display 32, which includes a keypad, LED indicators and an LCD message display, comprises the controls the user operates to effect dialing functions, etc.

The serial I/O 26 is used both with serial data from both the data port interface and the command port interface 30. The parallel I/O 28 is used with RS366 format data.

Having illustrated the principles of our invention with reference to a preferred embodiment, it should be obvious that the invention can be modified in arrangement and detail without departing from such principles. For example, while the invention has been described with reference to the particular application of disabling an echo canceller on a digital communications circuit, the invention has many other data communications applications. Similarly, while the invention has illustrated with reference to a ROM pattern memory that stores several bit shifted patterns of the 2100 hertz tone, alternative embodiments can be used. For example, a single tone pattern can be bit-shifted "on the fly" as necessary. Still other schemes may also be used. Accordingly, we claim all such variations as may come within the scope and spirit of the following claims and equivalents thereof.

We claim:

1. A telecommunications system comprising:
a bit-synchronous digital transmission circuit;
an echo canceller coupled to said transmission circuit, the echo canceller including disabling means for disabling operation of the echo canceller upon receipt of a predetermined command signal, said command signal comprising a sequence of digital data bits, the echo canceller including means for receiving said data bits in synchronous data frames defining command data bytes of fixed lengths; and
remote signalling means for transmitting the predetermined command signal to the disabling means, said remote signalling means comprising means for transmitting the digital data bits comprising the predetermined command signal repeatedly, each time with a different frame boundary so that one sequence of data bits will be framed into the data bytes that comprise the predetermined command signal.

2. The telecommunications system of claim 1 in which the remote signalling means includes:
memory means for storing a sequence of digitized samples corresponding to a 2100 hertz signal; and
controller means for retrieving said sequence of samples from the memory means and for transmitting said samples over the digital transmission circuit.

3. The telecommunications system of claim 2 in which the controller means includes means for repeatedly transmitting said sequence of samples to yield a transmission of at least 350 milliseconds in duration.

4. The telecommunications system of claim 1 in which the remote signalling means includes:
memory means for storing a plurality of sequences of digitized samples of a 2100 hertz tone signal, each of said sequences being bit-shifted relative to the others; and
means for transmitting said sequences of digitized samples to yield a transmission that includes each of said bit-shifted sequences for a duration of at least 350 consecutive milliseconds.

5. A method of disabling an echo canceller on a bit-synchronous digital data circuit, comprising the steps:
providing a digitally encoded 2100 hertz serial data stream; and
sequentially transmitting N different versions of said data stream, where N is the number of data bits in a byte, with each of said versions being bit shifted relative to the other versions.

6. A method of disabling an echo canceller in a byte-framed portion of a digital telecommunications system from a remote terminal unit in a unframed portion of said system, the telecommunications system including a framing device coupling the unframed and framed portions thereof for receiving serial data from the unframed portion and framing it by the addition of an (N+1)th bit after every N bits in the unframed serial stream, the framed data stream then being transmitted on the framed portion of the network, the system including means for disabling the echo canceller upon receipt of a control signal, the method comprising the steps:
transmitting from the remote terminal unit to the framed portion of the network a first sequence of bits that will be effective to disable the echo canceller if the framing device frames said sequence of bits in a first manner;
transmitting second through Nth sequences of bits that will be effective to disable the echo canceller if the framing device frames the second through Nth sequences of bits in second through Nth different manners, respectively.

7. In a digital telecommunications network that includes an echo canceller that can be selectively disable by receipt of a binary encoded control signal representing an analog signal comprised of bytes that each include N data bits, a method for disabling the echo canceller from a remote terminal unit that is not byte synchronized with the network, the method comprising the steps:
transmitting from the remote terminal unit to the network a first sequence of control signal bits that will be effective to disable the echo canceller if byte framing of the sequence by the network begins with the first bit of the sequence;
transmitting second through Nth sequences of control signal bits that will be effective to disable the echo canceller if byte framing of sequences by the network begins with the second through Nth bits, respectively.

8. The method of claim 7 in which the step of transmitting the first sequence of bits comprises repetitively transmitting a first pattern of bits and in which the steps of transmitting the second through Nth sequence of bits comprised repetitively transmitting second through Nth patterns of bits, respectively.

9. The method of claim 7 in which transmitting includes repetitively reading data from a memory.

10. The method of claim 7 in which N equals 7.

11. In a method of telecommunication that includes providing unframed serial data from a remote terminal unit through an unframed link to a framing device and onto a byte-framed digital network, the network including an echo canceller that can be selectively disable by receipt of a digital control signal comprised of bytes that include N data bits, a method for disabling the echo canceller from the remote terminal unit comprising the steps of transmitting from the remote terminal unit to the network N different sequences of control signal bits, one of which will always be effective to disable the echo canceller regardless of the framing imposed on the serial data by the framing device.

* * * * *